Figure 1:
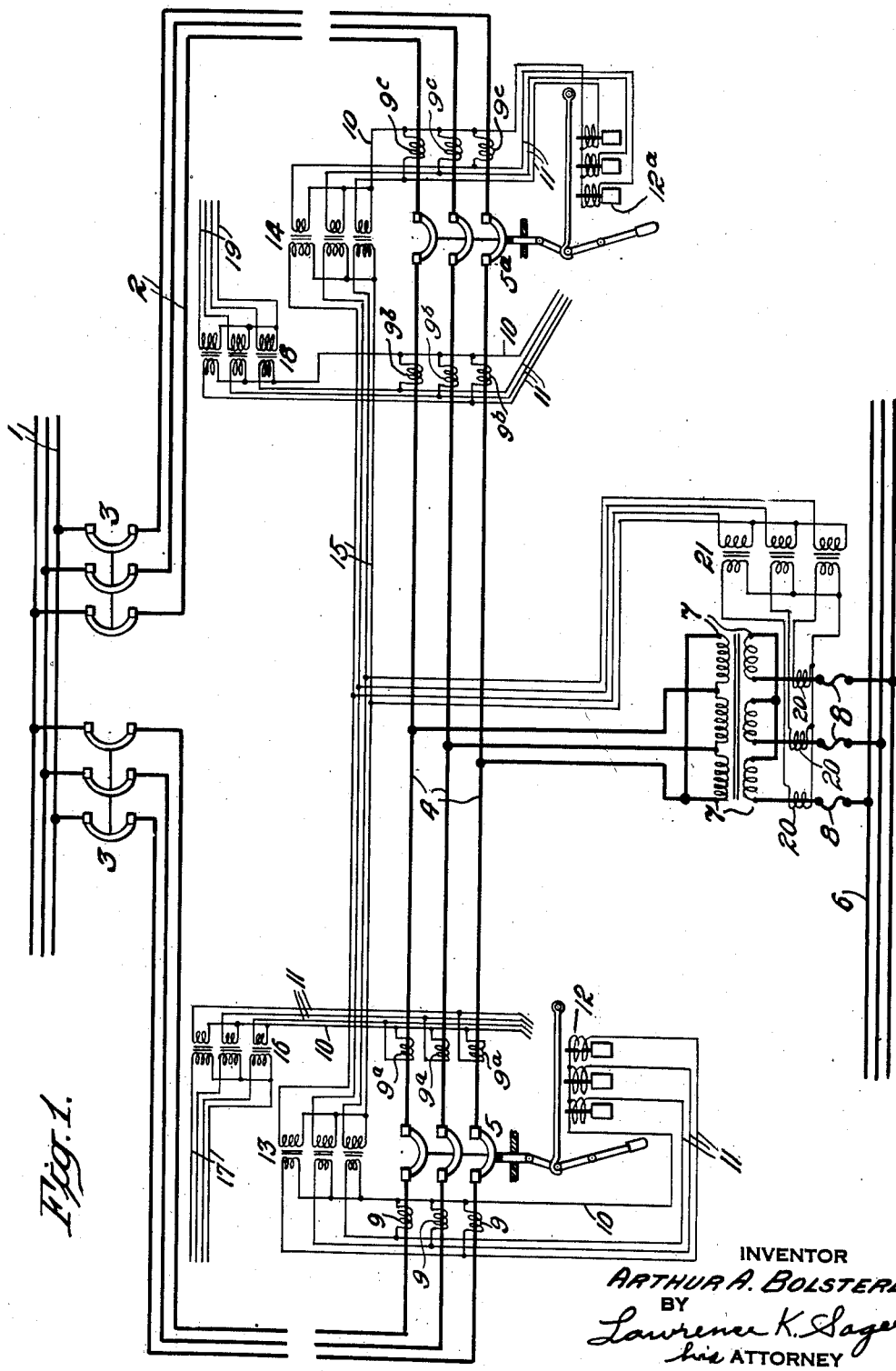

Nov. 23, 1943.                A. A. BOLSTERLI                2,335,103
                        ELECTRIC DISTRIBUTION SYSTEM
                          Filed July 15, 1941           2 Sheets-Sheet 1

INVENTOR
ARTHUR A. BOLSTERLI
BY
Lawrence K. Sager
his ATTORNEY

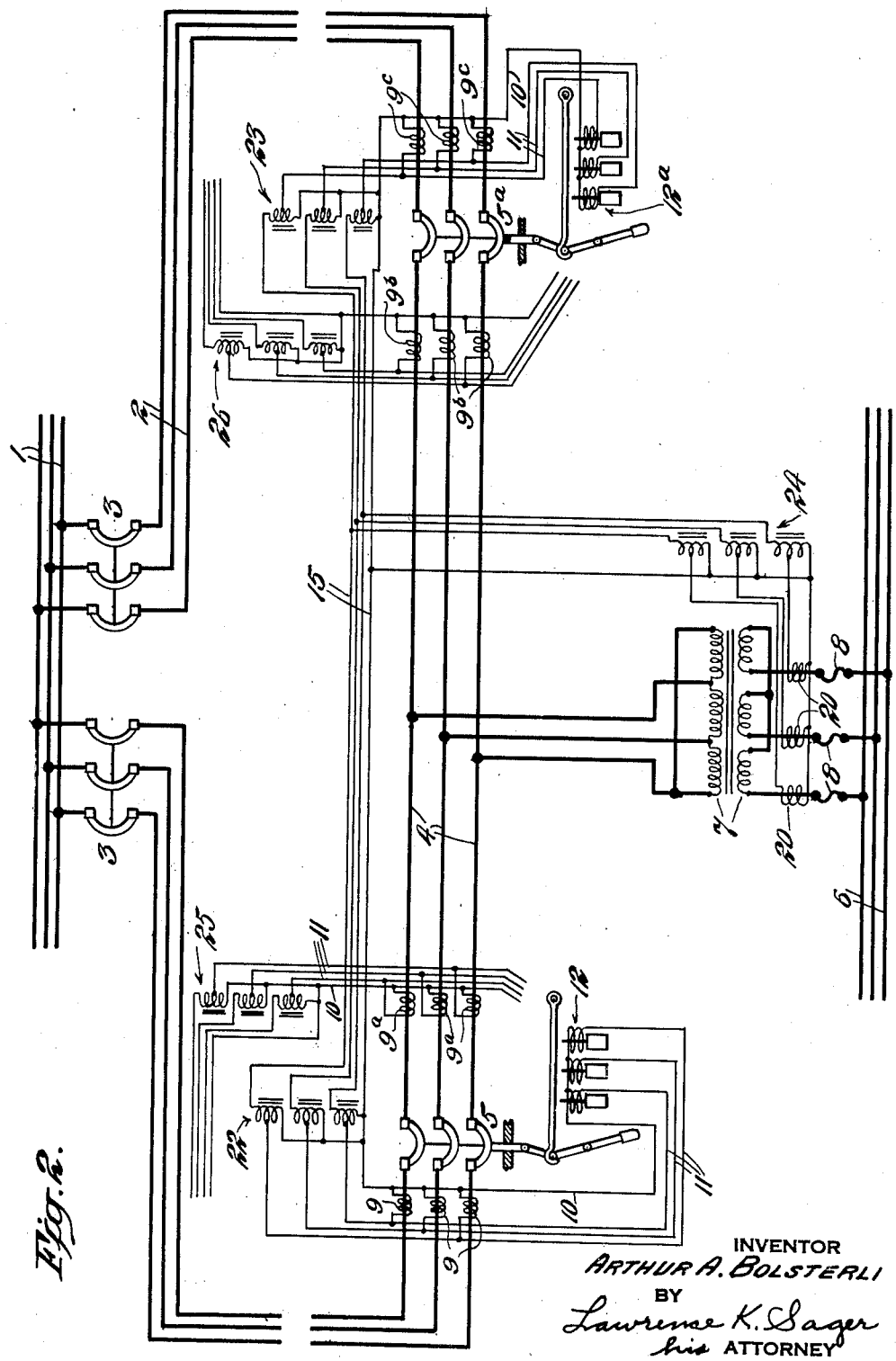

Patented Nov. 23, 1943

2,335,103

UNITED STATES PATENT OFFICE 2,335,103

ELECTRIC DISTRIBUTION SYSTEM

Arthur A. Bolsterli, Bethlehem, Pa., assignor, by mesne assignments, to Roller-Smith Company, a corporation of New York Application July 15, 1941, Serial No. 402,491

2 Claims. (Cl. 175—294)

This invention is an improvement in electric systems of distribution and is particularly applicable to those described in the Chase Patent No. 1,543,370, granted June 23, 1925, and the Wood Patent No. 2,208,781, granted July 23, 1940. In such systems a main loop feeder circuit is divided into sections from which distribution circuits are supplied which in turn are connected to a distribution network. At the end of each section of the loop feeder is a circuit breaker so that in case of a fault in any one section, or in its related parts, such faulty section may be disconnected from the loop at its ends and thereby permit the remaining portions of the loop and their sub-circuits to continue to function.

The removal of such a faulty section is accomplished automatically by the use of current transformers related to the sections and to the trip coils of the circuit breakers. These current transformers are applied to the main conductors of the loop at each end of each section and are interconnected by pilot wires in sectional relationship so as to control the circuit breakers to disconnect a faulty section. The pilot wires in some cases may extend over long distances depending upon the length of the loop sections and in the case of a fault in one section, the current in one or more adjoining sections may become so large as to trip unnecessarily the breakers of such adjoining section or sections. This is due to the fact that the resistance of the long pilot wires is sufficient to cause the voltage at the trip coils of the breakers protecting adjoining loops to increase to such an extent, upon the occurrence of a so-called through-fault, that such breakers are tripped and thereby disconnect sections in which no fault actually occurs. This action results because a current transformer is quite different in function from that of a potential transformer. In a current transformer, the current in the secondary winding corresponds with change of current in the primary winding; and it follows that upon any increase in current in the primary the voltage of the secondary must increase in order to force a corresponding increase of current through the circuit of the secondary. When the resistance of the secondary circuit is large, as in the case of long pilot wires, the voltage of the secondary winding must rise correspondingly high in order to force the necessary current through its circuit and this may cause the improper tripping of the circuit breakers.

One object of this invention is to overcome the difficulty above described. Another object is to accomplish this result by simple and inexpensive means which may be readily applied to such a system of control and to any existing system where the difficulty referred to arises. Another object is to accomplish this by apparatus which will be dependable and require no attention over long periods of service. Other objects and advantages will be understood from the following description and accompanying drawings.

Fig. 1 is a diagram showing one embodiment of the invention; and Fig. 2 is a diagram showing a modification.

Fig. 1 shows a three-phase distribution system as an illustrative example, the three-phase feeders 1 being indicated as supplying the three-phase loop circuit 2 through a pair of circuit breakers 3 at each end of the loop. The loop circuit is divided into a number of sections and in Fig. 1 only one such section 4 is shown complete. This section is provided with automatic circuit breakers 5, 5a at each end thereof and it will be understood that each of the other sections of the loop are similarly provided as well as with other apparatus shown. The loop 4 is shown supplying the network lines 6 through transformers 7 and fuses 8.

At the end of each section of the loop are indicated current transformers 9, 9a, 9b and 9c which are applied to each conductor of the three-phase loop and the secondary windings of these transformers are subjected to currents corresponding respectively with the amount of current in the loop conductors. With reference to the three current transformers 9, located at the end of the section adjoining the section 4, a terminal of each secondary winding is shown connected to a common conductor 10 and from the remaining terminals extend the three conductors 11 which are connected respectively to the three trip coils 12 of the circuit breaker, one trip coil for each phase. The current transformers 9a, located at one end of the section 4, are similarly connected and the conductors 10 and 11 therefrom are connected similarly to another set of trip coils of the circuit breaker 5, these connections and additional trip coils being omitted for clearness. Any form or type of circuit breaker may be used and the diagrammatic illustration thereof in the drawings is for the purpose of explanation only. The current transformers 9c, located at the end of the section adjoining the section 4, are similarly connected to the trip coils 12a of the circuit breaker 5a; and the current transformers 9b are similarly connected to additional trip coils of this breaker, these additional trip coils and connections thereto being omitted for clearness.

The current transformers at the ends of sections adjoining the section 4 in turn have their secondaries connected respectively to the primary windings of additional sets of current transformers 13 and 14 in the embodiment of the invention shown in Fig. 1. These additional transformers are step-up transformers and have the primary windings of each set connected to a common return, the remaining terminals being connected to the respective terminals of the secondary windings 9 and 9c. The secondary windings of the current transformers 13 and 14 are inter-connected by pilot wires 15, one of which constitutes a common return wire and the other three being connected to the corresponding terminals of the secondary windings of each phase. The secondary winding of the current transformers 9a are similarly connected to the primary windings of step-up current transformers 16 from the secondaries of which extend the pilot wires 17 which in turn are connected to the secondaries of similar step-up transformers which have their primary windings connected to the secondaries of the current transformers located at the end of the section beyond the section adjoining the section 4. Likewise the secondaries of the current transformers 9b are connected to the primary windings of step-up current transformers 18, the secondaries of which are connected to pilot wires 19 which are similarly connected to the secondaries of step-up transformers, the primaries of which are connected to the secondaries of the current transformers at the end of the section beyond the section adjoining section 4. As these connections are duplicates of the connections already described with reference to section 4, they are not shown for the sake of clearness of the diagram. The secondaries of the step-up transformers which are, as already explained, connected to the pilot wires, are so connected that the voltage of each secondary is made additive to that of the voltage of its corresponding secondary. For example, the upper secondary winding of the transformers 13 is connected in series with the upper secondary winding of the transformers 14 so that the voltage of each is cumulative in the circuit of the pilot wires connected thereto, and this likewise applies to each pair of secondaries connected to the respective pilot wires.

With reference to the branch line from the section 4 which supplies the network 6, the current transformer secondaries 20 are introduced in the feeders from the secondaries of the transformers 7. The secondaries 20 are connected respectively to the primaries of a set of step-up transformers 21, the secondaries of which are connected in proper phase relation across the pilot wires 15. The various sets of current transformers are so designed in relation to each other that under normal conditions the three currents balance, namely the currents carried at the two ends of a section and the branch current. That is, the combined ratios of the current transformers and step-up transformers are made such that for each phase the pilot wire current delivered at one end of a section is equal to that circulating at the other end plus the pilot wire current delivered by the branch. This applies under normal conditions and also upon the occurrence of a through-fault.

It will be apparent from the above description that the trip coils of the circuit breakers are respectively subjected to voltages which are lower than those to which the pilot wires are subjected and it is due to this separation of trip coil voltages as regards value from that of the pilot wire voltages that the difficulties, arising from through-faults already described, are overcome. For example, in prior systems, if a through-fault occurred, such as in the section at the right of section 4, the current through section 4 would greatly increase and might cause the tripping of the circuit breakers 5 and 5a because the current transformers 9 and 9c would, of course, pass increased current to the pilot wires and if the resistance of these pilot wires were comparatively high due to their long lengths, the voltage of the secondaries of the transformers 9 and 9c would be forced to such a high value in order to pass the increased current through the pilot wires, that this high voltage would cause tripping of the circuit breakers 5 and 5a and isolate the section 4, although no fault actually occurred in the section 4 or in its feeders to the network 6. However, by the present improvement, the occurrence of a through-fault would not cause the circuit breakers of section 4 to trip because the voltage of their trip coils would not rise sufficiently to trip the breakers. This is due to the fact that the stepping-up of the voltage applied to the pilot wires requires correspondingly less current through them; and it follows that the current transformers 9 and 9c are enabled to deliver a current to the pilot wires corresponding to that resulting from a through-fault, without such increase of voltage as would result in tripping the circuit breakers. Thus the undesirable tripping of the circuit breakers upon the occurrence of a through-fault is avoided.

In the case of the section in which the fault occurs, the situation is quite different and the circuit breakers at the end of that section will be properly tripped. For example, when a fault occurs in section 4, such as a ground or short-circuit on any one of its lines, current will pass from both ends of the section toward the fault and thereby cause a reversal in direction of the current in one of the transformers of the affected line with reference to the other transformer at the opposite end of the section. The voltage of the secondaries of the transformers 13 and 14 which are related to the affected faulted line will then be reversed in relation to each other and instead of being additive will oppose each other. In that event the corresponding windings of the current transformers 9 and 9c are obliged to build up their voltages to high values in an endeavor to force a correspondingly increased current through the related pilot wires. This high increase in voltage is sufficient to affect the related trip coils of the two circuit breakers and cause them to open which segregates the section 4 from the remaining portion of the loop circuit. Similarly any fault in the branch line, or in transformer 7, would cause the current transformers 20 to unbalance the system and result in the transformers 9 and 9c attaining a voltage sufficiently high to cause the tripping of their respective circuit breakers. The fuses 8 would be ruptured to isolate the faulty branch circuit, or faulty section, from the network.

This principle of applying a higher voltage to the pilot wires as compared with that applied to the trip coils of the breaker may be accomplished in various ways and by different forms of apparatus. Fig. 2 shows a modification where instead of using step-up current transformers having double windings, such as the transformers 13, 14, 21, 16 and 18, they are replaced by auto-transformers 22, 23, 24, 25 and 26. The other portions of Fig. 2 correspond with and are designated by the same characters as used in Fig. 1. The operation in avoiding undesired tripping of the circuit breakers of an unaffected section upon the occurrence of a through-fault while insuring the disconnection of a section wherein the fault occurs, is similar to that already described with reference to Fig. 1.

Although certain embodiments of this invention have been described, it will be understood that the invention may be embodied in various modifications without departing from the scope thereof and that the voltage applied to the pilot wires may be increased relatively to that applied to the trip coils of the breakers by means other than the particular disclosures of the drawings.

I claim:

1. A system of distribution comprising a loop circuit divided into sections, an automatic circuit breaker at each end of a section for isolating the same from the loop circuit, said circuit breakers each having tripping means responsive to abnormal increase in voltage thereon, current transformers related to the loop conductors at locations respectively adjoining said circuit breakers, pilot wires corresponding in extent to the respective sections, means connecting said current transformers to said tripping means, and additional current transformers respectively connected between said first named current transformers and said pilot wires for applying a higher voltage to said pilot wires than applied to said tripping means, said additional current transformers being respectively connected to said pilot wires to impose voltages thereon in an additive direction under normal current conditions in the related sections of the loop circuit.

2. A system of distribution comprising a loop circuit divided into sections, an automatic circuit breaker at each end of a section for isolating the same from the loop circuit, said circuit breakers having tripping means responsive to abnormal increase in voltage thereon, a branch circuit from the section, current transformers respectively related to the loop conductors at locations adjoining said circuit breakers and to the branch circuit, pilot wires corresponding in extent to the respective sections, means connecting the current transformers related to the loop conductors to said tripping means, and additional current transformers respectively connected between the current transformers related to the loop conductors and related to the branch circuit and said pilot wires for applying a higher voltage to said pilot wires than applied to said tripping means.

ARTHUR A. BOLSTERLI.